(12) United States Patent
Maenz (10) Patent No.: US 7,931,234 B2
(45) Date of Patent: Apr. 26, 2011

(54) CONTINUOUS FUSELAGE CONNECTION (75) Inventor: Christian Maenz, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 631 days.

(21) Appl. No.: 12/063,736

(22) PCT Filed: Aug. 14, 2006

(86) PCT No.: PCT/EP2006/008039
§ 371 (c)(1),
(2), (4) Date: Mar. 18, 2008

(87) PCT Pub. No.: WO2007/020049
PCT Pub. Date: Feb. 22, 2007

(65) Prior Publication Data
US 2009/0114772 A1 May 7, 2009

Related U.S. Application Data (60) Provisional application No. 60/709,050, filed on Aug. 17, 2005.

(51) Int. Cl.
*B64C 1/06* (2006.01)
(52) U.S. Cl. ............... 244/131; 244/3.24; 244/118.1; 244/87; 244/123.1
(58) Field of Classification Search .......... 244/131, 244/91, 3.24, 118.2, 87, 123.1
See application file for complete search history.

(56) References Cited

U.S. PATENT DOCUMENTS

| 3,004,645 | A | * | 10/1961 | Moul, Jr. ............... 244/131 |
| 4,448,372 | A | * | 5/1984 | Larson ................ 244/87 |
| 4,693,435 | A | * | 9/1987 | Percival et al. ........ 244/91 |
| 4,962,904 | A | * | 10/1990 | Perry et al. ............ 244/131 |
| 5,476,704 | A | * | 12/1995 | Kohler ................. 428/119 |
| 5,979,831 | A | * | 11/1999 | Seaquist .............. 244/158.1 |
| 6,938,856 | B2 | * | 9/2005 | Frontera Castaner ...... 244/87 |
| 7,205,066 | B1 | * | 4/2007 | Hammi et al. .......... 429/119 |
| 7,611,595 | B2 | * | 11/2009 | Barnes ................. 156/148 |
| 7,625,623 | B2 | * | 12/2009 | Grose et al. ........... 428/119 |
| 2004/0011927 | A1 | | 1/2004 | Christman et al. |

(Continued)

FOREIGN PATENT DOCUMENTS

DE 906897 3/1954

(Continued)

OTHER PUBLICATIONS

Charles Edward Chapel et al., Aircraft Maintenance and Repair, Northrop Aeronautical Institute, McGraw-Hill Book Company, Inc., 7 pages.

*Primary Examiner* — Christopher P Ellis
(74) *Attorney, Agent, or Firm* — Christopher Paradies; Fowler White Boggs P.A.

(57) ABSTRACT

An attachment system for attaching a tail unit to an attachment surface of an aircraft is disclosed. An attachment surface may be a fuselage, for example. In an arrangement, the attachment system includes a mounting with a first bearing surface that is capable of resting against the tail unit, and a second bearing surface that is capable of resting against the attachment surface. The first bearing surface and the second bearing surface, of which there is at least one, include a common line of contact. In the arrangement, the planes of the first bearing surface and of the second bearing surface are at an angle that differs from 0° and 180°.

13 Claims, 6 Drawing Sheets

U.S. PATENT DOCUMENTS

| | | | |
|---|---|---|---|
| 2005/0151018 A1* | 7/2005 | Schoene | 244/131 |
| 2008/0295334 A1* | 12/2008 | Kulesha | 29/897.2 |
| 2009/0200424 A1* | 8/2009 | Manz | 244/131 |

FOREIGN PATENT DOCUMENTS

| | | |
|---|---|---|
| DE | 3721092 A1 | 2/1988 |
| DE | 19547687 A1 | 6/1997 |
| DE | 29822310 U1 | 3/1999 |
| DE | 19920427 A1 | 11/2000 |
| DE | 19921690 A1 | 11/2000 |
| DE | 19922693 A1 | 11/2000 |
| DE | 20106535 U1 | 9/2001 |
| DE | 10117565 A1 | 7/2002 |
| DE | 202004012799 U1 | 1/2005 |
| DE | 202004015047 U1 | 2/2005 |
| DE | 202004015883 U1 | 2/2005 |
| DE | 10341323 A1 | 3/2005 |
| DE | 10341351 A1 | 3/2005 |
| DE | 102004037530 A1 | 3/2005 |
| EP | 1316501 A2 | 6/2003 |
| EP | 1016589 B1 | 9/2003 |
| FR | 543443 | 11/1921 |
| JP | 6-101997 | 4/1994 |
| RU | 1683269 A1 | 2/1995 |

* cited by examiner

Fig. 1

(PRIOR ART)

CONTINUOUS FUSELAGE CONNECTION

REFERENCE TO RELATED APPLICATIONS

This application claims the benefit of the filing date of the German Patent Application No. 10 2005 038 856.6 filed Aug. 17, 2005, and the U.S. Provisional Application No. 60/709,050 filed Aug. 17, 2005, the disclosures of each of which is hereby incorporated herein by reference.

FIELD OF THE INVENTION

The field relates to an attachment system and a method for attaching a tail unit surface to the fuselage of an aircraft.

BACKGROUND OF THE INVENTION

Up to now in aircrafts, the vertical tail unit is attached to the fuselage with the use of several horizontally attached bolts. In this arrangement, the walls of the vertical tail units are first inserted into fork-like apertures in the fuselage, and are subsequently attached using of the horizontally aligned bolts. Bushes that in each instance, are attached to the center box shells and to the fuselage mountings, are used to accommodate the bolts. In particular in the case of the vertical tail unit of an aircraft, very considerable transverse forces are experienced over the entire tail unit surface, as a result of which extensive tensile and compressive forces occur in the base region of the vertical tail unit. The bolts therefore have to deflect very considerable tensile and compressive forces into the fuselage so that in order to transfer these forces, the walls of the center box shells in the connection region need to comprise very large thickened parts so as to provide a stable structure. Furthermore, the fuselage mountings to which the bolts are attached on the fuselage may comprise corresponding dimensions. Moreover, in the region of the bolts in the fuselage mountings, a high load concentration of the forces to be transferred is experienced so that their dimensioning has to be additionally adapted.

SUMMARY OF THE INVENTION

Among other things, it may be an object to provide a stable and light-weight connection system for attaching a tail unit surface.

The term "tail unit" may refer to a surface of an aircraft, such as for example, a vertical tail unit or a horizontal tail unit.

The term "attachment surface" may refer to a surface of an aircraft, on which surface the tail units may be attached, for example, a fuselage.

According to one embodiment, an attachment system for attaching a tail unit to an attachment surface of an aircraft, comprises a tail unit, an attachment surface and a mounting comprising a first bearing surface that is designed to rest against the tail unit, and a second bearing surface that is designed to rest against the attachment surface. In this arrangement, the first bearing surface and the second bearing surface, of which there is at least one, comprise a common line of contact. The first bearing surface comprises a first surface and the second bearing surface comprises a second surface, wherein the angle of the first surface and the second surface differs from 0° and 180°.

According to an embodiment, a method for attaching a tail unit to an attachment surface of an aircraft is provided, where the method involves the steps of placing a mounting with a first bearing surface to a tail unit, and in a further step, placing a mounting with a second bearing surface to an attachment surface, wherein the first bearing surface and the second bearing surface comprise a line of contact. The first bearing surface comprises a first surface and the second bearing surface comprises a second surface, wherein the angle of the first surface and the second surface differs from 0° and 1800.

In a further embodiment, the attachment system is used for attaching a tail unit to an attachment surface of an aircraft. In a further embodiment, an aircraft with a system for attaching a tail unit to an attachment surface is provided.

The attachment system according to one embodiment, provides a connection option that is lighter in weight and more stable solution when compared to the hitherto known connection systems. Up to now, for example, large thickened parts had to be provided in the base regions of the tail units and on the fuselage, in order to predominantly transfer to the fuselage the bending moments that act on the vertical tail unit. Such thickened parts result in very considerable additional weight and in significantly increased costs during production. Due to the connection system according to one example, by using a mounting, there is no need to provide such thickened parts of the tail units in the base regions and in the fuselage. At the same time, stress concentrations are avoided and thus homogeneous transmissibility of very considerable forces is allowable. Unnecessary weight costs due to reduced material usage, may be one of the advantages offered by continuous fuselage connection. The attachment system according to one example, may connect a tail unit to a fuselage, or it may interconnect two tail unit surfaces. For example, V-tails may be used to connect the two vertical tail units by the attachment system according to one example.

According to another embodiment, the first bearing surface and the tail unit comprise a first contact region with a first surface shape, wherein the first surface shape of the first contact region corresponds to the first surface shape of the tail unit. Furthermore, the second bearing surface and the attachment surface comprise a second contact region with a second surface shape, wherein the second surface shape of the second contact region corresponds to the shape of the attachment surface. In this way a situation may be achieved in which the mounting conforms to the attachment surface or to the shape in the contact region of the tail unit, thus allowing a connection having positive fit, to be established.

According to another embodiment, the first bearing surface and the second bearing surface of the mounting extend along the course of the line of contact. In this way, the mounting extends, for example, along the entire line of contact between the tail unit and the attachment surface. This may allow for achievement of homogeneous force transmission along the entire line of contact so that stress peaks may be avoided.

According to another embodiment, the tail unit comprises an inside and an outside, wherein the first bearing surface is designed to rest against at least one of the insides and/or outsides of the tail unit. Modern designs of tail units comprise a thin-walled outer skin with inner reinforcements, for example by way of braces or a framework. This may allow for attachment of the mounting to an inside or to an outside of a tail unit wall or of a tail unit surface. Attaching the mounting to the inside of the first or the second tail unit surface results, on the outside, in a smooth surface without edges that thus provides optimum air flow characteristics so that airflow losses as a result of turbulence at corners or edges of the mounting are avoided.

According to yet another embodiment, the attachment system further comprises at least one first connection element and a second connection element, wherein the tail unit is connected to the first bearing surface using the first connection element, and the attachment surface is connected to the second bearing surface using the second connection element.

According to yet another embodiment, the first connection elements or the second connection elements at least in a first row are arranged substantially parallel in relation to the line of contact. According to yet another embodiment, at least the first connection elements or the second connection elements comprise a plurality of rows parallel to the line of contact. In this way, the connection elements may transfer significantly greater loads. For example, the various rows of connection elements may be arranged so as to be offset in relation to each other, so as in this way to may be provide optimum load distribution of the forces to be transferred.

According to another embodiment, the first connection element comprises a first direction of extension and the second connection element comprises a second direction of extension, wherein the first direction of extension and the second direction of extension differ from each other. In this way, tensile and compressive forces, for example, may be optimally introduced from a tail unit to the fuselage.

According to yet another embodiment, the first direction of extension of the first connection element is arranged so as to be substantially perpendicular in relation to the tail unit while the second direction of extension of the second connection element is arranged so as to be substantially perpendicular in relation to the attachment surface. This results in optimal and homogeneous load distribution and in optimal transfer of the forces, for example, of two surfaces arranged so as to be substantially perpendicular in relation to each other. In this way, the tensile and compressive forces that are experienced may be transferred better.

According to another embodiment, at least one of the first and second connection elements is a disconnectable connection. In this way, particular installation procedures are significantly facilitated because the mounting may be flexibly attached to the respective surfaces. In this arrangement, the first connection element and the second connection element, of which there is at least one each, may be selected from the group comprising screw connections, bolt connections, welded connections, adhesive connections, riveted connections and plug-type connections.

According to another embodiment, the first bearing surface comprises a first tooth profile, and the tail unit in the first contact region comprises a second tooth profile, wherein the second tooth profile of the tail unit is designed to engage the first tooth profile of the first bearing surface.

According to another embodiment, the second bearing surface comprises a third tooth profile and the attachment surface in the second contact region comprises a fourth tooth profile, wherein the fourth tooth profile of the attachment surface is designed to engage the third tooth profile of the second bearing surface. In this way, by using the engaging tooth profiles, highly continuous force transfer is achieved without the occurrence of undesirable stress concentration such that significantly greater forces may be transferred.

According to another embodiment, at least one of the tooth profiles is detachably attached. In this way, installation of the connection system may be facilitated.

In a further embodiment, each tooth profile comprises elevations and indentations with flanks. The flanks of the tooth profiles may be designed so as to be at right angles in relation to the direction of the transferred forces. In this way considerably greater loads may be transferred and damage to the tooth profiles may be avoided.

In a further embodiment, each tooth profile may be selected from the group comprising dovetail shapes, T-groove shapes, longitudinal groove shapes and trapezoidal groove shapes.

In a further embodiment, compensating media are attached between the flanks of the tooth profiles such that an even load distribution results. In order to provide ideal transmission of forces, the individual tooth profiles may be manufactured to extremely exact tolerances so that no stress peaks occur as a result of inexactly made tooth profiles. Since this results in very high production costs, compensating media are attached in between the teeth, i.e., in between the flanks of the teeth, so that there may be no need to produce to such exacting and expensive tolerances. The compensating media, for example, may comprise a material such as a soft metal, a wood fiber material or a plastic material such as polytetrafluorethylene (PTFE).

According to a further embodiment, the mounting comprises a third bearing surface or a plurality of bearing surfaces against which tail unit surfaces and/or fuselages come to rest. This means that two tail unit surfaces may be attached to a fuselage with the use of only one mounting. A fuselage is an example of an attachment surface but other attachment surfaces besides the fuselage mounting may be used.

According to a further embodiment, an attachment surface mounting is inserted in between at least one of the first bearing surfaces and the tail unit. According to a further embodiment, the fuselage mounting is inserted in between at least one of the second bearing surfaces and the attachment surface. A fuselage mounting is an example of an attachment surface mounting, but any other attachment surface mounting may be used. This fuselage mounting may bridge any differences in shape, for example, between the fuselage and the mounting, and in this way, may optimize load distribution. From an unfavourably curved shape, a straight supporting surface may be created by using the adaptive fuselage mounting, as a result of which any tensile and compressive forces may be transferred to the fuselage in a significantly better manner.

According to another embodiment, at least one of the first and second bearing surfaces comprise at least one slot arrangement. By using the single or multiple slot arrangement, a significant reduction in stiffness fractures, and in addition better load distribution, may be achieved.

In this arrangement, the connection system according to one example, may connect vertical tail units and horizontal tail units with other attachment surfaces such as for example, the fuselage. V-tails or a horizontal tail unit or a vertical tail unit may be attached to an attachment surface jointly by using one mounting.

According to a further embodiment of the method, in a further step, the first bearing surface with a first contact region is matched to the contour of the tail unit, and in a further step, the second bearing surface with a second contact region is matched to the contour of the attachment surface.

According to a further embodiment of the method, in a further step, the first bearing surface and the second bearing surface are matched to the course of the line of contact.

According to a further embodiment of the method, the first bearing surface is attached at least to one of the insides and outsides of the tail units and attachment surfaces.

According to a further embodiment of the method, in a further step, the tail unit is coupled to the first bearing surface using a first connection element, and in a further step, the tail unit is connected to the second bearing surface using a second connection element.

According to a further embodiment of the method in a further step, the tail unit is connected to the first bearing surface using a first and second tooth profile, and/or in a further step, the attachment surface is connected to the second bearing surface using a third and fourth tooth profile.

The embodiments of the attachment system also apply to the method, and vice versa.

The connection system according to one example, and the method according to one example, thus provide a significantly lighter and more effective system of connecting tail unit surfaces to fuselages. The expenditure and the weight of the structure may be reduced enormously with the use of the continuous fuselage connection. Furthermore, with the use of the innovative connection elements, the time required for installing tail units to fuselages may be significantly reduced.

BRIEF DESCRIPTION OF THE FIGURES

Below, for further illustration and to provide a better understanding of the continuous fuselage connector, embodiments are described in more detail with reference to the enclosed drawings.

DETAILED DESCRIPTION

The examples described and drawings rendered are illustrative and are not to be read as limiting the scope of the invention as it is defined by the appended claims.

Identical or similar components in different figures are provided with the same reference characters.

The illustrations in the figures are diagrammatic and not to scale.

Figure 2:
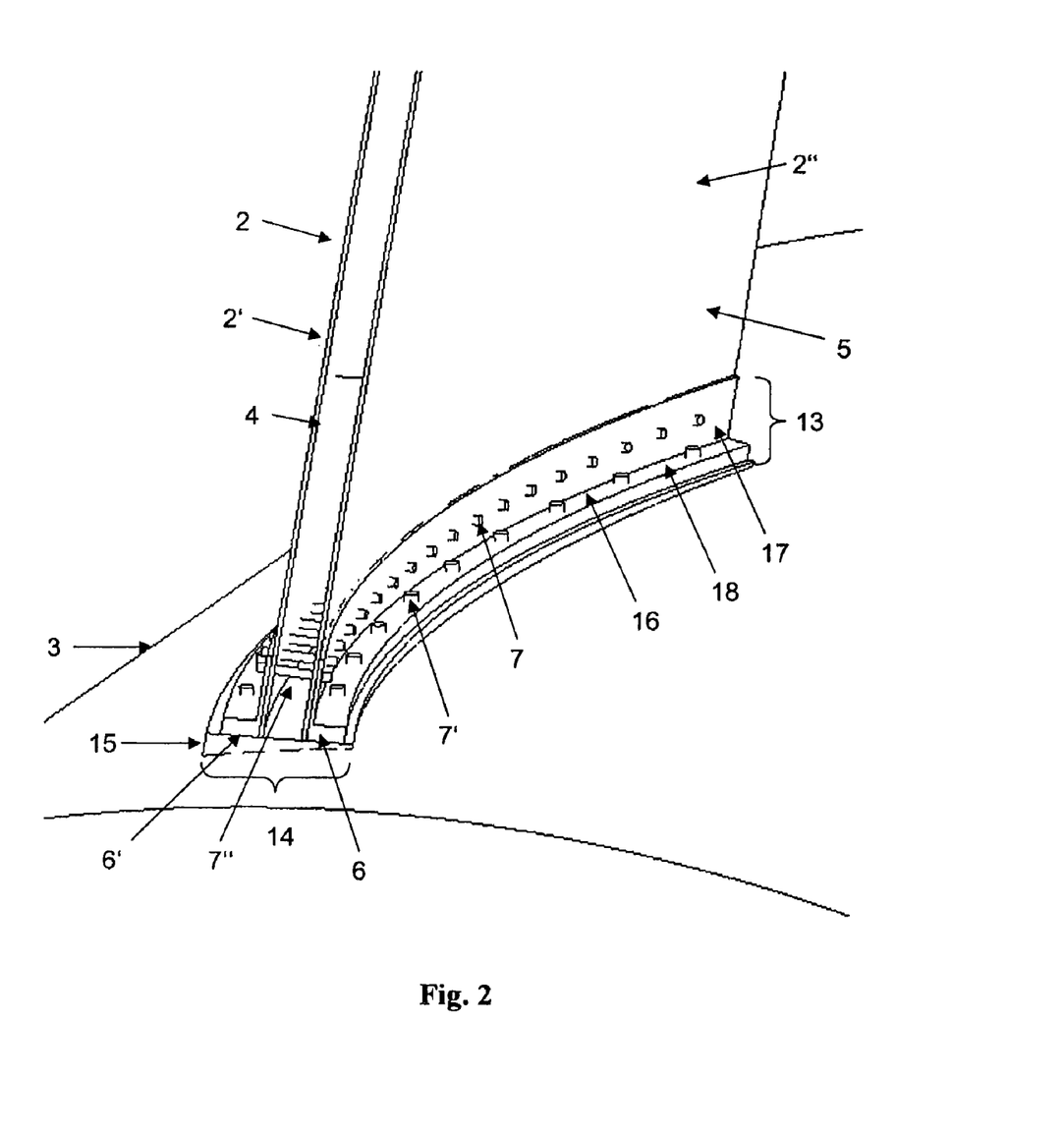
FIG. 2 shows a diagrammatic illustration of a vertical tail unit that has been attached to an attachment surface with the use of an attachment system according to an embodiment.

FIG. 2 is a diagrammatic illustration of the attachment system 1 according to an embodiment, for attaching a tail unit 2 to an attachment surface 3 of an aircraft. The attachment surface may be a fuselage, for example. In this arrangement, a mounting 6 comprises a first bearing surface 17 that is designed to rest against a tail unit 2, and a second bearing surface 18 that is designed to rest against the attachment surface 3. In this arrangement, the first bearing surface 17 and the second bearing surface 18 comprise a common line of contact 16, wherein the first bearing surface 17 and the second bearing surface 18 differ from each other in that their surfaces are at an angle that differs from 0° and 180°.

Figure 1:
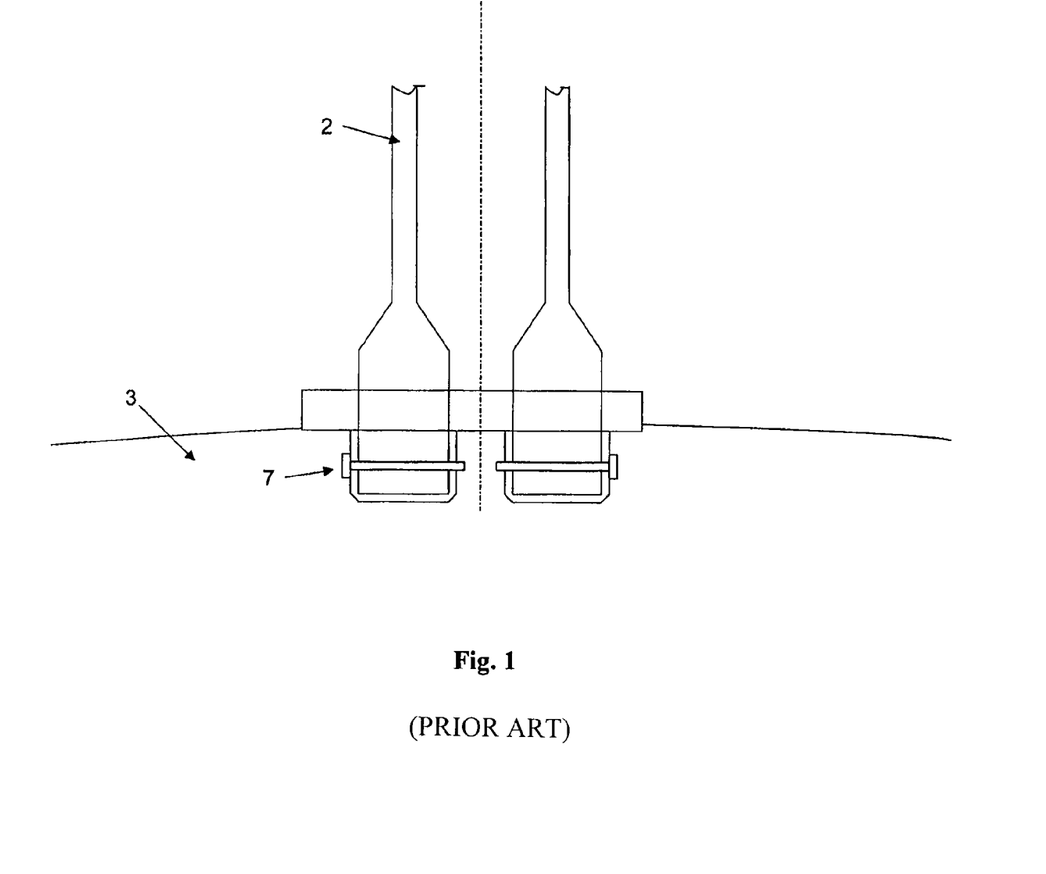
FIG. 1 shows a known connection system for connecting a tail unit to a fuselage.

FIG. 1 shows a commonly used connection system of a vertical tail unit 2 with an attachment surface, such as a fuselage, for example. As a result of the unidirectional horizontally attached connection elements 7 such as bolts, for example, that connect the base of the vertical tail unit 2 to the fuselage 3, thickened parts in the base region of the vertical tail unit are required in order to reinforce the structure. This results in a significant increase in weight and increased costs for materials.

FIG. 2 also shows the structure of modern vertical tail units 2. In this arrangement, a vertical tail unit 2 comprises two walls, each comprising an inside 4 and an outside 5. At the base of the tail unit 2, on the so-called center box shell, in a first contact region 13, a mounting 6, 6' which extends along the length of the vertical tail unit 2 is attached and conforms to the shape of the first contact region 13. At the same time the mounting is attached in a second contact region 14 to a attachment surface, such as a fuselage, for example with the use of a second bearing surface 18. This second bearing surface 18 has the same shape as the attachment surface 3 in the second contact region 14.

In this arrangement, the first bearing surface 17 and the second bearing surface 18 of the mounting 6, 6' are each attached to the vertical tail unit 2 or to the attachment surface using 3 connection elements 7, 7'. At the same time, a attachment surface mounting 15 may be attached between the attachment surface 3 and the mounting 6, 6' so as to achieve better load distribution between the contour of the fuselage 3 and the contour of the mounting 6, 6'.

The connection elements 7, 7' may also extend through both walls of the vertical tail unit 2 and may thus connect a second outer mounting 6' at the same time. In this arrangement, a distance sleeve 7'' may be inserted between the two walls 2', 2." Furthermore, in this example, the directions of extension of the connection elements 7, 7' are in each case, oriented along the normal surface line of the respective bearing surface 17, 18. In this way, the flow of forces is significantly enhanced and any transfer of additional moments by one-sided connection is prevented.

In order to achieve an improved connective strength, for example, there is also an option of designing the connection elements 7, 7', apart from the shape shown in FIG. 2, to be in several rows substantially parallel to the line of contact 16. For example, the connection elements 7, 7' may comprise a first row parallel to the line of contact 16, and furthermore, comprise at least one second row of connection elements 7, 7' parallel to the line of contact 16. In this arrangement, any number of rows may be attached. For example three to four rows may be used in one preferred embodiment.

Figure 3:
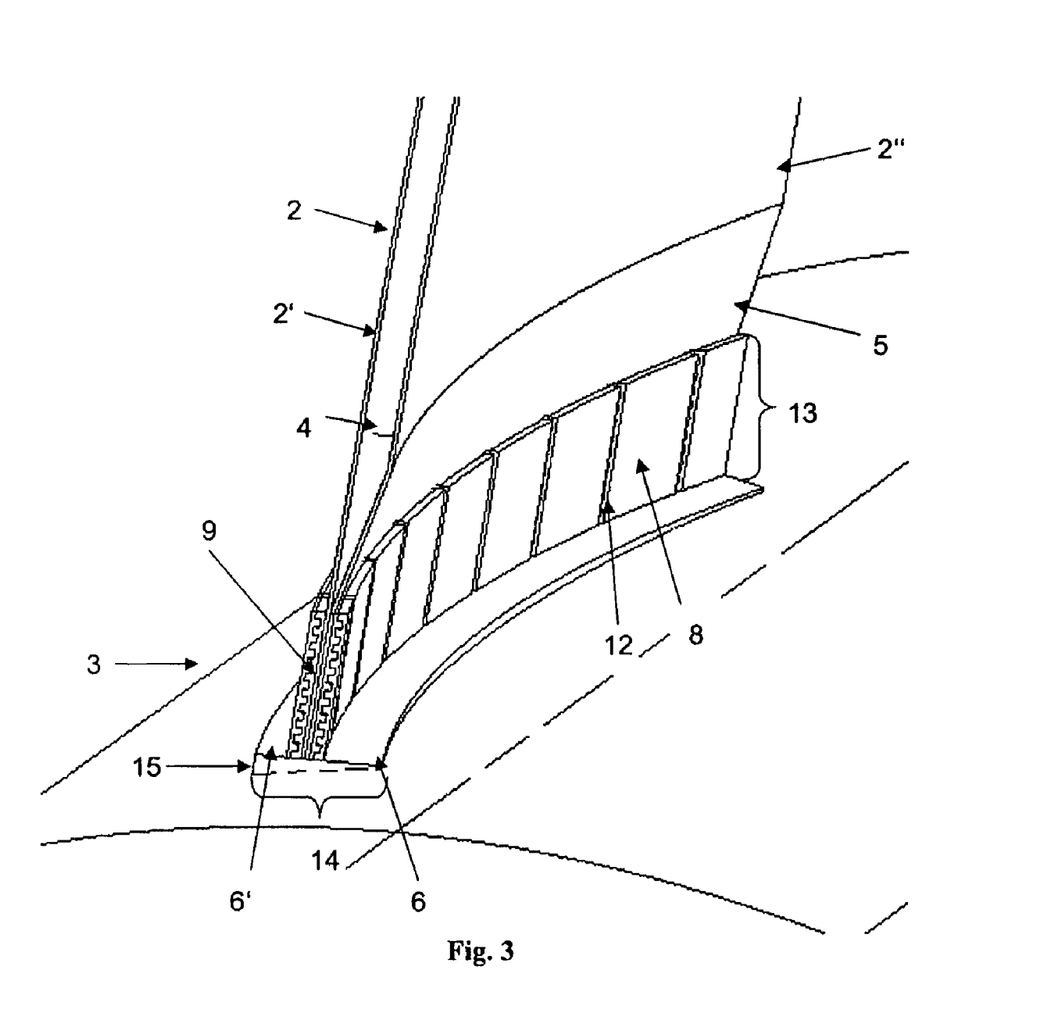
FIG. 3 shows a diagrammatic illustration of an embodiment, in which the vertical tail unit is attached to an attachment surface with the use of a tooth profile.
Figure 4:
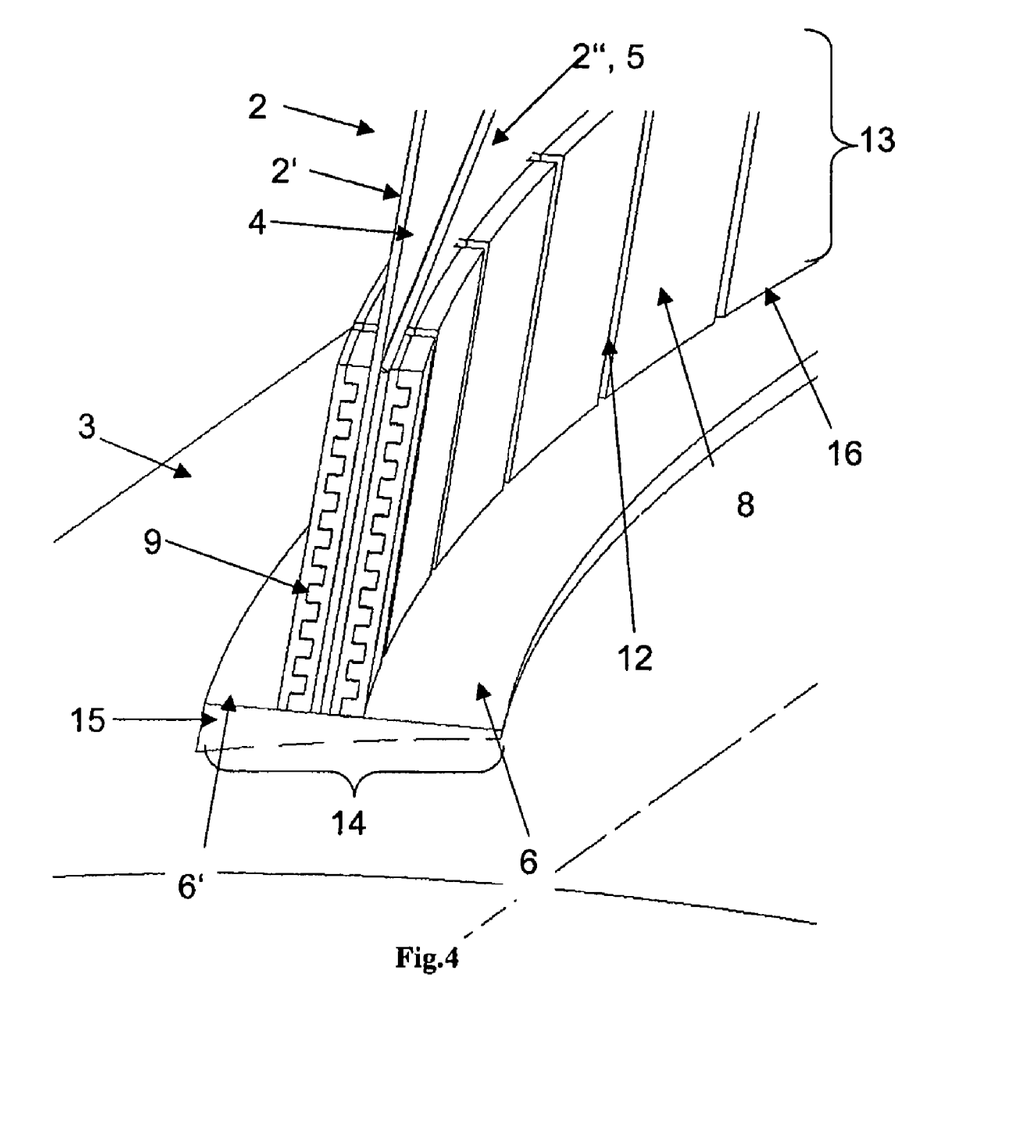
FIG. 4 shows an enlarged diagrammatic illustration of a vertical tail unit that is attached to an attachment surface using a tooth profile, according to one embodiment.

FIG. 3 shows another example of the attachment system. In FIG. 3, the design is similar to that shown in FIG. 2, except that instead of the connection element 7, 7', a tooth profile with a first tooth rack 8 and with a second tooth rack 9, in one example, has been shown. By using tooth profiles 8, 9, the mountings 6 and 6' may ideally be connected to the vertical tail unit 2. As an option, the mounting 6, 6' may also be attached to the attachment surface 3 using a third and fourth tooth profile. In FIGS. 2 to 4, the mounting 6, 6' conforms to the respective bearing surface 17, 18 of the vertical tail unit 2 or of the attachment surface 3. By using tooth profiles 8, 9, forces may be transferred to the attachment surface 3 in an extremely homogeneous manner. Excessive load concentrations may effectively be prevented. In each instance, in longitudinal direction of the first and second tooth profiles 8, 9, slot arrangements 12 which play a part in reducing stiffness cracks, thus resulting in improved load distribution. The tooth profiles 8, 9 in turn may be attached to the inside or outside of the walls of a vertical tail unit 2.

FIG. 4 shows a further view of a vertical tail unit 2 that is attached to a attachment surface 3 using an example of the connection system 1. The illustration shows that if a tooth profile is used to connect the vertical tail unit 2 to the attachment surface 3, the design may be kept extremely slim in the first contact region 13.

Figure 5:
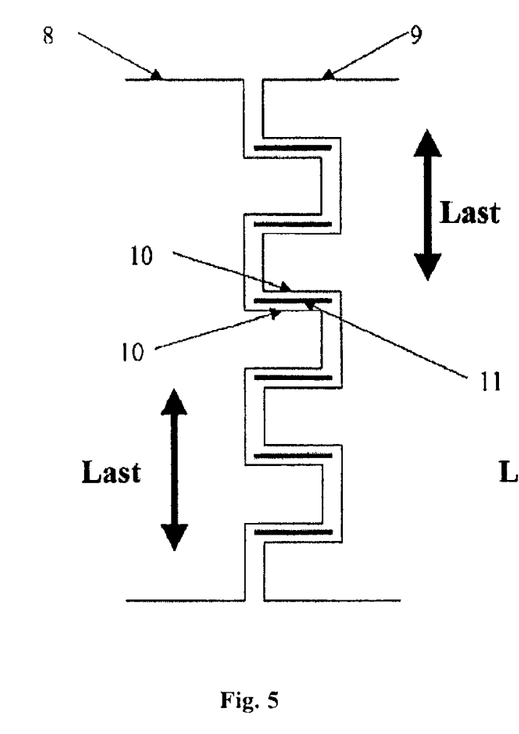
FIG. 5 shows a diagrammatic illustration of a rectangular tooth profile according to one embodiment.

FIG. 5 is a diagrammatic illustration of the first tooth rack 8 and the second tooth rack 9 which engage each other. In this arrangement, which is merely one example, tooth profiles 8, 9 comprise flanks 10, which in FIG. 5, are formed in a rectangular design. For better and more homogeneous force transfer, compensating media 11 have been placed between the flanks 10. If, as shown in this example, tensile or compressive forces act on the vertical tail unit 2, then loads are developed in a vertical direction. In this arrangement, the force is optimally transferred if the flanks 10 are designed so as to be at a right angle in relation to the direction of the forces to be transferred.

Figure 6:
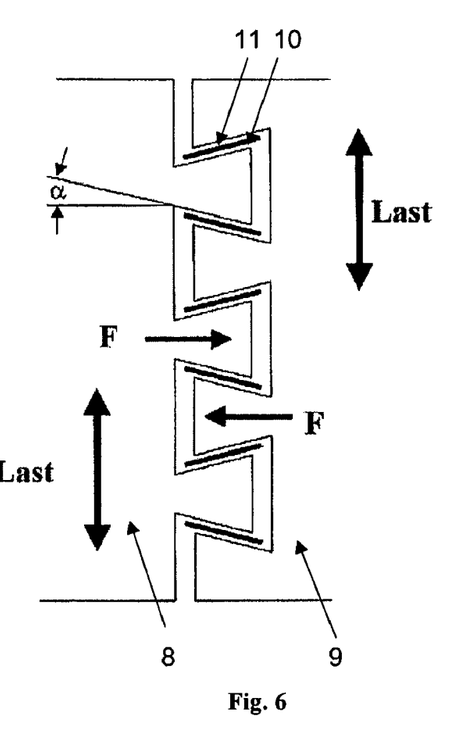
FIG. 6 shows a diagrammatic illustration of a dovetail profile with an angle α according to one embodiment.

FIG. 6 also shows an example of the first tooth rack 8 and the second tooth rack 9. In this example, the tooth profile is designed so as to be dovetailed. In this arrangement, the flanks 10 are arranged at a particular angle $\alpha$, which indicates the angle of the flanks 10 in relation to the direction of transfer of the force F and of the load.

Figure 7:
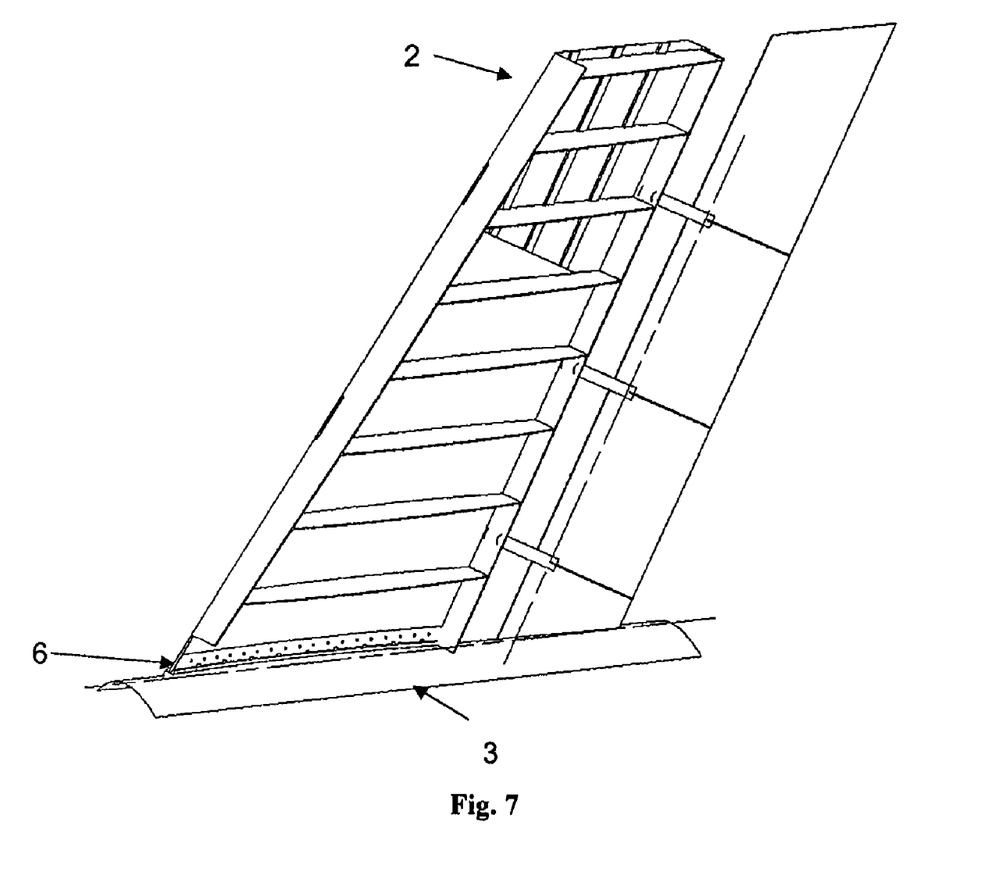
FIG. 7 shows a diagrammatic illustration of the connection system according to one embodiment.

FIG. 7 shows an example of an overall view of a vertical tail unit 2. On the base of the vertical tail unit 2, an example of the connection system 1 that connects the vertical tail unit 2 to the fuselage 3 is shown. Without any thickened part in the base region of the vertical tail unit 2, an optimal connection system 1 is created, and at the same time, a more stable and more light-weight connection option may be provided.

In addition, it should be pointed out that "comprising" does not exclude other elements or steps, and "a" or "one" does not exclude a plural number. Furthermore, it should be pointed out that features or steps which have been described with reference to one of the above embodiments may also be used in combination with other features or steps of other embodiments described above. Reference characters in the claims are not to be interpreted as limitations.

Alternative combinations and variations of the examples provided will become apparent based on this disclosure. It is not possible to provide specific examples for all of the many possible combinations and variations of the embodiments described, but such combinations and variations may be claims that eventually issue.

LIST OF REFERENCE CHARACTERS

| | |
|---|---|
| 1 | Aircraft |
| 2 | Tail unit |
| 2'/2" | Wall |
| 3 | Attachment surface |
| 4 | Inside of a tail unit wall |
| 5 | Outside of a tail unit wall |
| 6/6' | Mounting |
| 7/7' | First/second connection element |
| 7" | Distance sleeve |
| 8 | First tooth profile |
| 9 | Second tooth profile |
| 10 | Flanks |
| 11 | Compensating medium |
| 13 | First contact region |
| 14 | Second contact region |
| 15 | Attachment surface mounting |
| 16 | Line of contact |
| 17 | First bearing surface |
| 18 | Second bearing surface |

The invention claimed is:

1. An attachment system for attaching a tail unit to an attachment surface of an aircraft, comprising:
    an attachment surface, and
        a mounting having a first bearing surface that is capable of resting against the tail unit, and a second bearing surface that is capable of resting against the attachment surface of the aircraft, wherein the first bearing surface and the second bearing surface comprise a common line of contact,
    the first bearing surface forms a first surface and the second bearing surface forms a second surface,
    the first surface and the second surface define an angle which differs from 0° and 180°, *the* first bearing surface and the tail unit each comprise a first contact region with a first *surface shape*, and *the* first surface shape of the first bearing surface contact region corresponds to the first *surface* shape of the tail *unit*.

2. The attachment system according to claim 1,
    wherein the second bearing surface and the attachment surface comprise a second contact region with a second surface shape, and the second surface shape of the second contact region corresponds to the second surface shape of the attachment surface, such that a form fit connection is provided.

3. The attachment system according to claim 1,
    wherein the tail unit comprises an inside and an outside, the first bearing surface is capable of resting against at least one of the inside and the outside of the tail unit.

4. The attachment system according to claim 1, further comprising a plurality of first connection elements and a plurality of second connection elements,
    wherein the tail unit is connected to the first bearing surface using the plurality of first connection elements, and
    the attachment surface is connected to the second bearing surface using the plurality of second connection elements.

5. The attachment system according to claim 4,
    wherein at least one of the first and second connection elements is selected from the group consisting of screw connections, bolt connections, welded connections, adhesive connections, riveted connections and plug-type connections.

6. The attachment system according to claim 1
    wherein the first bearing surface comprises a first tooth profile,
    the tail unit in the contact region comprises a second tooth profile, and
    the second tooth profile of the tail unit is capable of engaging the first tooth profile of the first bearing surface.

7. The attachment system according to claim 1,
    wherein the second bearing surface comprises a third tooth profile,
    the attachment surface in the contact region comprises a fourth tooth profile, and the fourth tooth profile of the attachment surface is capable of engaging the third tooth profile of the second bearing surface.

8. The attachment system according to claim 6,
    wherein each tooth profile comprises elevations and indentations with flanks, and the flanks of the tooth profiles are capable so as to be at right angles in relation to a direction of transferred forces.

9. The attachment system according to claim 8,
    wherein compensating media are attached between the flanks of the tooth profiles such that an uniform load distribution results.

10. The attachment system according to claim 9,
    wherein a material of the compensating media is selected from a group consisting of soft metals and plastics.

11. The attachment system according to claim 1,
    wherein an attachment surface mounting is inserted between the first bearing surface and the tail unit.

12. The attachment system according to claim 1,
    wherein an attachment surface mounting is inserted between the second bearing surface and the attachment surface.

13. The attachment system according to claim 1,
    wherein one of the first bearing surface and the second bearing surface each comprise a slot arrangement.

* * * * *